United States Patent [19]

Timmers

[11] Patent Number: 4,623,165
[45] Date of Patent: Nov. 18, 1986

[54] AIR LIFT AXLE

[76] Inventor: Richard E. Timmers, 11425 University Dr., Coral Sand Estates, Apache Junction, Mesa, Ariz. 85220

[21] Appl. No.: 716,028

[22] Filed: Mar. 26, 1985

[51] Int. Cl.$^4$ .............................................. B60G 11/26
[52] U.S. Cl. .................................... 280/704; 267/122
[58] Field of Search ............................ 280/704, 43.23; 180/24.02, 209; 267/64.27, 122

[56] References Cited

U.S. PATENT DOCUMENTS

| 3,771,617 | 11/1973 | Horning | 180/24.02 |
| 3,771,812 | 11/1973 | Pierce et al. | 180/24.02 |
| 4,082,305 | 4/1978 | Allison et al. | 280/704 |
| 4,165,792 | 8/1979 | Hohl et al. | 180/24.02 |
| 4,204,697 | 5/1980 | Santerre | 180/24.02 |

FOREIGN PATENT DOCUMENTS 961516  1/1975  Canada ................. 280/704

OTHER PUBLICATIONS

Brochure obtained by Inventor from unknown catalog.

Primary Examiner—John J. Love
Assistant Examiner—Ross Weaver
Attorney, Agent, or Firm—Merchant, Gould, Smith, Edell, Welter & Schmidt

[57] ABSTRACT

An air lift axle assembly (2) for stabilizing a vehicle (1) which is subjected to crosswinds. The assembly also increases the vehicle's ultimate load carrying capacity. The assembly includes a set of tires (3) which may be remotely lowered to engage the road surface (4) by means of an inflatable bladder (28) which presses against a spar (22), the spar being pivotably mounted to the vehicle by means of hollow bar (10). Springs (25) retract the assembly when not in use such that the deflated bladder (28) is housed within a canister (27), the canister (27) providing sufficient support to the inflated bladder (28) such that additional longitudinal stiffening of the bladder (28) is unnecessary.

1 Claim, 5 Drawing Figures

U.S. Patent  Nov. 18, 1986  Sheet 1 of 3  4,623,165
FIG. 1
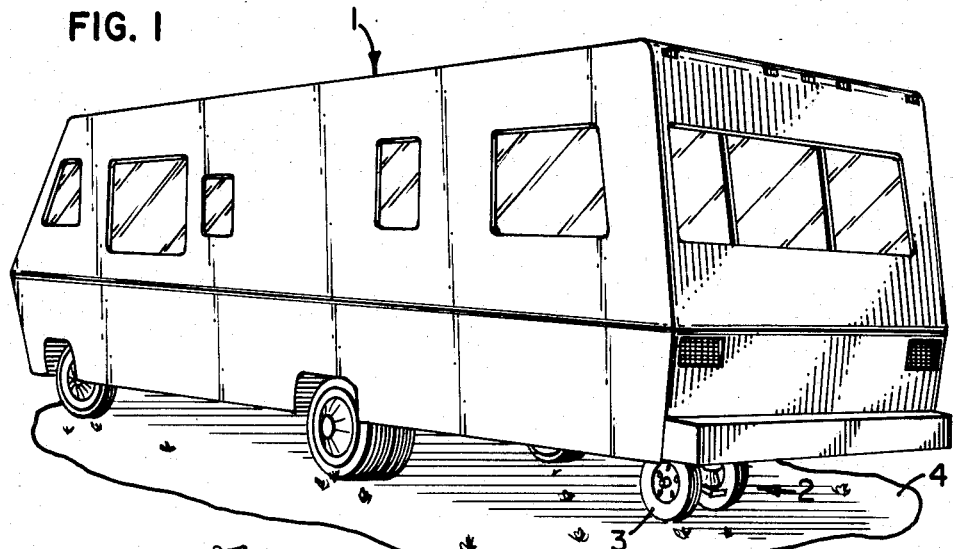
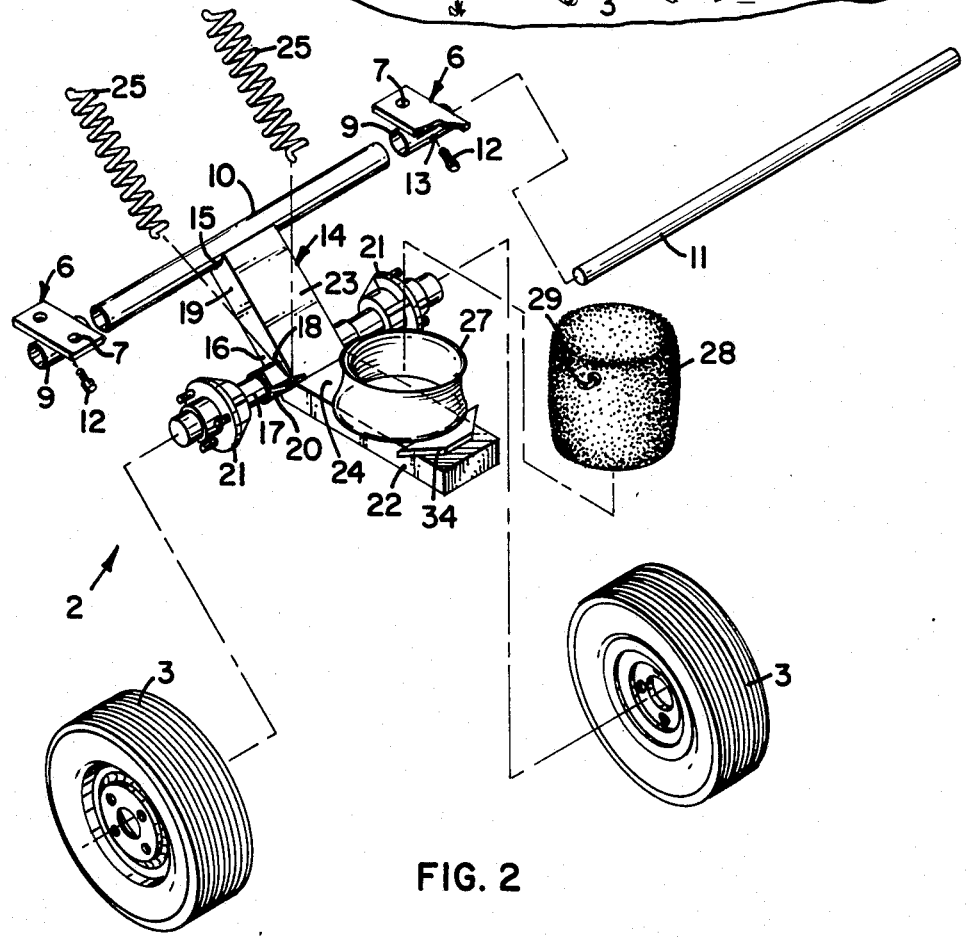
FIG. 2

AIR LIFT AXLE

BACKGROUND OF THE INVENTION

1. Field of the Invention

This invention relates generally to a motor vehicle stabilizing apparatus. In particular, this invention relates to an apparatus for bringing an additional set of tires into contact with the road surface for use with a van or recreational type vehicle.

2. Background of the Invention

Many vehicles such as vans, campers and recreational vehicles possess an aerodynamically inefficient profile which presents a broad surface easily affected by cross winds. The shape of the vehicle is dictated by the designer's attempt to provide maximum internal capacity in a relatively compact shape. Such vehicles are generally in the shape of a rectangular solid, and possess a length substantially greater than their width. These vehicles are generally supported by a pair of axles, each axle containing one or two tires at each end. Vehicles of this type typically present a substantial surface area which is particularly susceptible to wind loading in a direction perpendicular to the direction of vehicle travel. Wind loading acting against the side of the vehicle can cause difficulty in maintaining the desired direction of travel and can cause the vehicle to sway or oscillate depending on the natural resonant frequencies of the vehicle structure.

In order to maintain stability in high winds, the configuration of many two axle vehicles dictates that each axle should be located at the extreme end of the vehicle. However, due to considerations of vehicle load carrying ability, weight distribution and a desire to reduce the vehicle's turning radius, the rear axle on such vehicles is typically located an appreciable distance inward from the rear end of the vehicle. The rear portion of a vehicle with such an axle configuration is thus cantilevered beyond the rear axle, up to as much as one half of the vehicle's entire length. Under high wind loading conditions, the rear portion of such a vehicle is unable to adequately resist the tendancy to sway or oscillate, thereby transmitting appreciable bending and torsional moments to the forward portion of the vehicle, making the vehicle difficult to control.

Motor vehicle designers have sought to increase the stability of generally rectangular, broad surfaced vehicles in numerous ways. One solution is to move the rear axle further towards the extreme rear end of the vehicle, but this modification increases structural loads on the center portion of the vehicle and has the undesirable effect of increasing the vehicle's turning radius. Another solution is to try to shape the side portions of the vehicle such that they present a less aerodynamically conspicuous configuration. Effective aerodynamic solutions, however, tend to reduce the internal capacity and utility of the vehicle. Finally, tire width may be increased in an effort to put a larger tread surface in contact with the road. This approach is only marginally successful because it adds stability to an area already anchored to the road surface and therefore does not address the problem caused by oscillation of the cantilevered portion of the vehicle.

Another person with large volume vehicles is the user's tendency to overload or improperly load the vehicle. Extremely heavy heads may be easily placed within a van or recreational vehicle with little consideration given to the limitations of the vehicle's structural and suspension system. A poorly distributed load may cause portions of the vehicle to sag, or may induce impermissibly large stresses in the vehicle frame due to the increased bending moments along the vehicle's floor span.

The simplest solution to this problem is to increase the strength of the vehicle frame, but this approach adds weight thereby increasing vehicle fule consumption. If the vehicle body has a cantilevered portion, an uneven load distribution might cause the unsupported area to deflect beyond acceptable limits. The frame reinforcement necessary to prevent such deflection would be quite detrimental to vehicle efficiency due to the increased weight.

SUMMARY OF THE INVENTION

The subject invention overcomes some of the disadvantages of the prior art, including those mentioned above, in that it comprises an additional tire or set of tires which may be brought into contact with the road surface, usually near the extreme rear end of an elongated vehicle, thus increasing the vehicle's frictional contact with the road surface and adding structural support at a point of inherent instability. The presence of the additional tire(s) increases load carrying capacity of the vehicle without overstressing the vehicle frame. The placement of the additional tire(s) inhibits swaying movement in the rear of a cantilevered vehicle even when subjected to high cross winds, and prevents sagging of the vehicle's rear even when heavily loaded.

The subject invention includes a pivoting axle attached to the underside of the vehicle, which may be remotely operated from the driver's position while the vehicle is stationary or in motion and the additional tire(s) is thereby brought into contact with the road surface. In a preferred embodiment, one tire is attached to each end of a relatively short axle. During normal operation, the axle is retracted and the tires are thus prevented from contacting the surface of the road. When high cross winds are encountered, an air compressor is used to fill an inflatable bladder which presses against the axle and lowers it into firm contact with the road. When cross winds or vehicle overload diminish such that the additional tire(s) is no longer needed, the inflatable bladder may be emptied, again remotely from the driver's position, and a permanently mounted spring draws the axle back into its position against the underside of the vehicle frame.

BRIEF DESCRIPTION OF THE DRAWING

FIG. 1 is a perspective view of a recreational vehicle employing a preferred embodiment of the present invention, which is depicted in its fully extended position.

FIG. 2 is a perspective view of the present invention depicted in FIG. 1 showing in expanded form the relationship of the component parts.

DESCRIPTION OF THE PREFERRED EMBODIMENT

Figure 3:
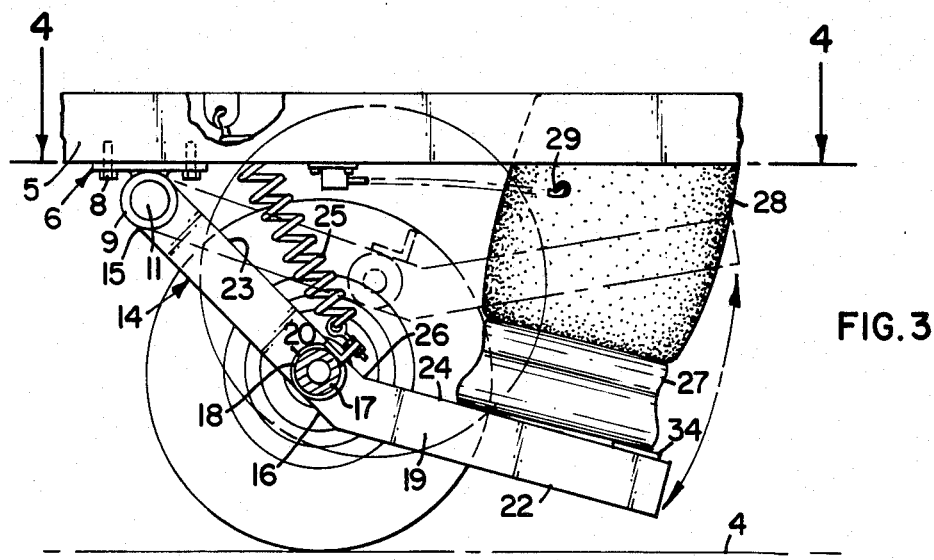
FIG. 3 is a side elevational view of the present invention depicted in FIG. 1 showing the present invention in both its extended and retracted position.
Figure 4:
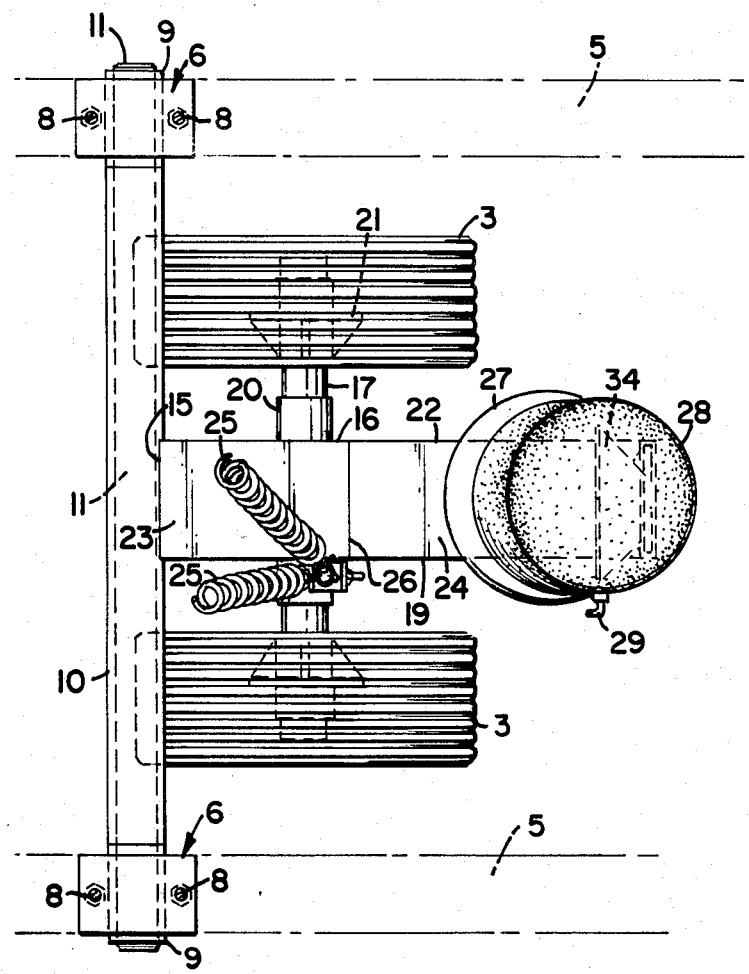
FIG. 4 is a plan view of the embodiment of the present invention shown in FIG. 1.
Figure 5:
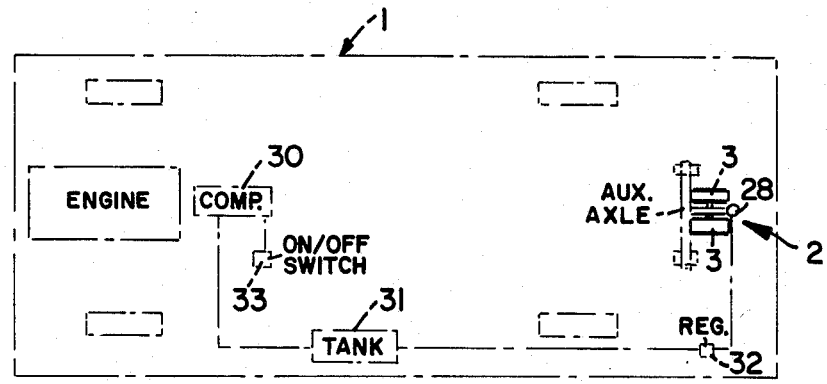
FIG. 5 is a schematic view of the preferred embodiment of the present invention showing the interconnection of system components required to remotely raise and lower the apparatus.

The preferred embodiment of the subject invention will now be discussed in some detail in conjunction with all of the figures of the drawing, wherein like parts are designated by like reference numerals, insofar as it is possible and practical to do so.

Referring now to FIG. 1, there is shown a typical recreational vehicle 1 on which the present invention has been mounted. The air lift axle 2 has been extended so that the tires 3 are in contact with the road surface 4.

As can be seen in FIG. 2, the air lift axle 2 may be mounted to the frame 5 of the vehicle 1 by means of mounting brackets 6. The mounting brackets 6 support a hollow bar 10 which serves as the support and pivot assembly for the remainder of the air lift axle 2. The mounting brackets 6 generally contain holes 7, such that shafted fasteners 8 may be extended through the holes 7 and attached to the frame 5 of the truck or vehicle. Each of the brackets may be fabricated from a high strength metal, such as steel, or any other strong, durable material. Attached to the mounting brackets 6, typically by welding, is a small hollow shaft 9, typically less than a foot in length. The spacing of the mounting brackets 6 when mounted on the vehicle should be sufficient to permit the insertion of the hollow bar 10 between the mounting brackets 6. The respective inner and outer diameters of the small hollow shafts 9 and the hollow bar 10 are typically identical. Both the hollow bar 10 and the hollow shaft 9 may be formed from cold rolled steel.

A solid rod 11 is inserted sequentially through one mounting bracket 6, the hollow bar 10 and the other mounting bracket 6. Thus, the hollow bar 10 pivots about and is supported by the solid rod 11. The solid rod 11 is held in a stationary position by set screws 12 which are inserted through small openings 13 in each of the brackets. Removal of the solid rod 11 from the mounting brackets 6 permits hollow bar 10 to be removed and the air lift axle assembly 2 to be taken away from the vehicle 1 entirely. The air lift axle assembly 2 may thus be removed from the vehicle for maintenance and later replaced merely by aligning the hollow bar 10 with the mounting brackets 6 and again inserting the solid rod 11 sequentially through the first mounting bracket 6, the hollow bar 10 and finally through the second mounting bracket 6.

Attached to the central portion of the hollow bar 10 is a box girder 14. The box girder 14 is typically attached to the hollow bar 10 by welding or may be molded or formed as part of an integral bar-girder assembly. The box girder 14 is generally rectangular in shape, and is mounted so as to be substantially perpendicular to the hollow bar 10. A first end 15 of the box girder 14 is generally concave in shape so as to encompass the surface contour of the hollow bar 10.

The purpose of box girder 14 is to serve as a structural link between the frame 5 and tire, or set of tires 3, which are typically supported on an axle 17. Thus, the second end of the box girder 14 is perforated by the axle 17, which is parallel to the hollow bar 10. The axle 17 passes through circular openings 18 in the side walls 19 of the second end 16 of the rectangular box girder 14. Bearings 20 are mounted at the circular open-ings 18 and have an inside diameter sufficient to encompass the axle 17. Mounted at each end of the axle 17 is a hub mechanism 21 upon which the tires 3 may be conveniently mounted.

As may be conveniently seen in FIG. 3, a means of raising and lowering the axle 17 is required. The components needed to accomplish this function may be conveniently linked to the axle 17 by means of a spar 22. Therefore, attached to the second end 16 of the rectangular box girder 14 is the spar 22. The angle formed between the top surface 23 of rectangular box girder 14 and the upper surface 24 of the spar 22 is generally between 90 and 180 degrees. Springs 25 are attached near the joint 26 of rectangular box girder 14 and the spar 22, extending to suitable anchoring points on the underside of the frame 5 of the vehicle 1. When the air lift axle assembly 2 is not in use, the springs 25 retract the entire air lift axle 2 and urge the axle 17 toward the frame 5 of the vehicle 1.

The spar 22 serves as a platform for the extension means used in the air lift axle assembly 2. Mounted on the upper surface 24 of the spar 22 is a canister 27, which may be rigidly attached to spar 22 by welding or by means of suitable fastener. Residing within the canister 27 is an inflatable bladder 28. The bladder 28 is a commercially available item used for such purposes as an inflatable "jack" which may be placed beneath a vehicle when changing a flat tire, for example. The inflatable bladder 28 contains a valve 29 through which air may be introduced or removed from the inflatable bladder 28. When the air lift axle assembly 2 is not in use, the inflatable bladder 28 is emptied and deflates to a size and shape which may be fully housed within the canister 27. The springs 25 then retract the air lift axle assembly 2 toward the frame 5 of the vehicle 1 until the canister 27 is prevented from further movement by coming into contact with the vehicle frame 5.

When high cross wind conditions or additional load carrying capacity require the extension of the air lift axle assembly 2, the inflatable bladder 28 may be inflated by means of a compressor 30. The compressor 30 maintains a suitable pressure within tank 31, typically within the range of 20 to 50 pounds per square inch. The tank 31 is connected to the inflatable bladder 28 through a regulator 32, which is typically preset to maintain a bladder pressure of 10 to 15 pounds per square inch. An off/on switch 33 is conveniently located near the dirver's positoin within the vehicle such that the air lift axle assembly 2 may be operated by the driver while the vehicle is in motion. Activation of the switch 33 causes the compressor 30 to pressurize tank 31, thereby inflating bladder 28 through regulator 32. When use of the air lift axle 2 is no longer required, switch 33 is deactivated and bladder 28 gradually deflates. Springs 25 pull spar 22 toward frame 5, thereby collapsing bladder 28 into canister 27 and lifting tires 3 from the road surface 4.

The regulator 32 may also include a three position valve, such that in a first position the tank 31 is isolated from inflatable bladder 28, thereby maintaining the pressure in the bladder 28 regardless of tank pressure. In a second position, the tank 31 is connected to bladder 28, typically to inflate bladder 28 to the tank pressure. A third position interconnects bladder 28 to the atmosphere, thereby permitting rapid deflation of the bladder 28. The operation of regulator valve 32 may be accomplished by the use of switch 33.

Shim 34 may be affixed to spar 22 in order to adjust the alignment of cannister 27. Ideally, cannister 27 should be oriented such that the force exerted by bladder 28 against spar 22 has a substantial component normal to the plane defined by the road surface 4.

From the foregoing, it may readily be seen that the subject invention comprises a new, unique, and exceedingly useful vehicle stabilizng device which constitutes the considerable improvement over the known prior art. Obviously, many modifications and variations of the present invention are possible in light of the above teachings. It is, therefore, to be understood that within the scope of the appended claims, the invention may be practiced other than is specifically described.

I claim:

1. A device for stabilizing a motor home vehicle by increasing the number of tires in contact with a road surface, comprising:
   (a) a mounting assembly, the mounting assembly being affixed to the vehicle, the mounting assembly including a pair of brackets, each bracket including a mounting plate to which is rigidly attached a hollow tube, the mounting of each bracket containing a plurality of holes through which a fastener may be placed in order to affix the mounting plate to the vehicle;
   (b) a solid rod, the solid rod having a longitudinal axis, the solid rod being rigidly attached to the mounting assembly within the hollow tubes of the brackets by means of set screws passing through the hollow tubes;
   (c) a hollow bar, the hollow bar having a longitudinal axis parallel to the longitudinal axis of the solid rod, the hollow bar encompassing the solid rod such that the hollow bar may rotate about the longitudinal axis of the solid rod, the hollow bar being pivotably mounted to the vehicle by means of the solid bar passing sequentially through the hollow tube of one of the pair of brackets, the hollow bar, and the hollow tube of the remaining bracket;
   (d) a box girder, the box girder being rigidly affixed to the hollow bar, the box girder having a longitudinal axis that is substantially perpendicular to the longitudinal axis of the hollow bar, the box girder having a first end and a second end, the first end being formed as a concave surface so as to encompass the hollow bar to which the box girder is rigidly attached;
   (e) an axle, the axle passing transversely through the box girder and being mounted thereto such that the axle may freely rotate, the box girder including bearings, the bearings being mounted adjacent to the second end of the box girder so as to support the axle;
   (f) a plurality of tires, the tires being attached to the axle;
   (g) a spar, the spar being rigidly attached to the axle, the spar having a longitudinal axis, the spar being rigidly attached to the second end of the box girder, the longitudinal axis of the box girder intersecting the longitudinal axis of the spar at an angle which is greater than 90° and less than 180°;
   (h) an inflatable bladder, the bladder residing between the spar and the vehicle such that when the bladder is inflated, the hollow bar is caused to pivot about the solid rod such that the tires are forcibly pressed into contact with the road surface;
   (i) a plurality of springs, each spring having a first end and a second end, the first end being attached to the vehicle and the second end being attached to the second end of the box girder such that the spring urges the spar toward the vehicle;
   (j) a canister, the canister having a base, the canister having an open top, the canister being rigidly mounted to the spar so as to house and support the inflatable bladder, the inflatable bladder being fully contained within the canister when the bladder is deflated, the bladder having a circular platform, the canister having a continuous sidewall, the sidewall sloping inwardly from the base to a point near the open top, the sidewall sloping outwardly from the point until reaching the open top of the canister;
   (k) a shim, the shim being rigidly affixed between the spar and the canister so as to tiltably align the canister, the canister being aligned such that a force exerted by the bladder against the spar has a substantial component normal to a plane defined by the road surface;
   (l) a pressure vessel, the pressure vessel being interconnected with the inflatable bladder so as to inflate the bladder;
   (m) a compressor, the compressor being interconnected with the pressure vessel so as to maintain a supply of pressurized air to the pressure vessel;
   (n) a control valve regulator, the control valve regulator being interconnected with the inflatable bladder so as to permit inflation and deflation of the bladder.

* * * * *